United States Patent [19]
Talbot

[11] 3,809,478
[45] May 7, 1974

[54] ANALYSIS AND REPRESENTATION OF THE SIZE, SHAPE AND ORIENTATION CHARACTERISTICS OF THE COMPONENTS OF A SYSTEM

[76] Inventor: John Henry Talbot, 35 Balvicar Rd., Blairgowrie, Johannesburg, Transvaal, South Africa

[22] Filed: May 27, 1971

[21] Appl. No.: 147,436

[30] Foreign Application Priority Data
May 29, 1970 South Africa ...................... 70/3652
Nov. 23, 1970 South Africa ...................... 70/7901

[52] U.S. Cl. ............ 356/71, 350/162 SF, 356/111, 356/102
[51] Int. Cl. ............................................. G06k 9/08
[58] Field of Search ............ 356/106, 71, 102, 103; 350/162 SF

[56] References Cited
UNITED STATES PATENTS
3,536,377 10/1970 Lowenthal .................... 350/162 SF
3,565,565 2/1971 Reid .............................. 350/162 SF
3,488,106 1/1970 Lohmann ...................... 350/162 SF
3,497,704 2/1970 Holmes et al. ................ 350/162 SF
3,451,755 6/1969 Silverman et al. .................. 356/106
3,469,921 9/1969 Taylor ................................. 356/102

OTHER PUBLICATIONS
Laboratory Determination of MTF from Line Spread Function; Fisher et al.; 10/1967.

*Primary Examiner*—Ronald L. Wibert
*Assistant Examiner*—Conrad Clark
*Attorney, Agent, or Firm*—Young and Thompson

[57] ABSTRACT

The invention relates to a diffractrometer for analysing the geometrical characteristics of the components of a system. In such a diffractrometer the received diffraction pattern is filtered in accordance with a mathematical equation to yield a spatial period spectrum or a moment, excluding the zeroth moment, of that spectrum. The filtering may be effected by means of suitable optical filters for viewing on a screen or for electronic detection, or electronically in the detector circuits.

24 Claims, 10 Drawing Figures

ANALYSIS AND REPRESENTATION OF THE SIZE, SHAPE AND ORIENTATION CHARACTERISTICS OF THE COMPONENTS OF A SYSTEM

This invention relates to the analysis and representation of geometrical characteristics of the components of a system.

The system in question may either comprise a solid object or alternatively a single or multiphase fluid system.

Thus for example the invention could be employed in the geometrical characterization of particles suspended in a liquid such as in the automatic quality control of a mill product. The invention is also applicable in the medical field to the characterization of tissues for tissue matching. A third application is image analysis or the spectral analysis of images, for example, electron and photomicrographs.

Methods of analysing the geometrical properties of systems of the kind here in question are already known. Thus a known method employs coherent light to illuminate the system. The far-field diffraction pattern of the illuminated system is received and the pattern thus received is translated into the spatial frequency spectrum which is displayed or photographed. Size and shape analyses are then made from this spatial frequency spectrum.

A problem associated with this earlier method of size and shape analysis has been to find a satisfactory method of specifying the size and shape distributions of a population containing objects of a great variety of sizes and shapes. Where the objects in a group all have the same shape, then a representative dimension may be assigned to each object and the size distribution specified by giving the distribution of representative dimensions.

For example, where the objects are all spheres, the diameter of each sphere may be chosen as the representative dimension and the size distribution specified by the distribution of diameters. The same applies to objects all having some other shape. A problem arises where the shapes of the objects are all different. Then there is no linear dimension in one that corresponds to a linear dimension in another. In such cases the size of each particle can be specified by its volume but a problem arises when it is not practicable or convenient or economic to measure the volume of each object.

The present invention is based on the discovery of a new concept of "the spatial period spectrum." This new concept may be defined as follows:

The far-field diffraction pattern is usually described in terms of a wave amplitude function $\psi(k, k)$, where $k, k$ are orthogonal transverse components of the diffracted wave vector $k$. Denoting the complex conjugate of this function by $\psi^*$, the illuminance is $\psi^*\psi$. The luminous flux through a selected area of a plane in the far-field is obtained by integrating $\psi^*\psi$ over the appropriate area. In some cases it is more convenient to use the polar coordinates $k_r$, the radial component of $k$, and $\phi$, the azimuth angle.

The spatial period $d$ is related to $k_r$ by $$d = 2\pi/k_r.$$

One way of defining the spatial period spectrum is $$P(d, \phi) = \lim_{\substack{a \to 0 \\ b \to 0}} \frac{\int_{\frac{2\pi}{d}-a}^{\frac{2\pi}{d}+a} \int_{\phi-b}^{\phi+b} k_r \psi^* \psi \, dk_r \, d\phi}{2ab/\pi} \quad (1)$$

It will be appreciated that $P$ may be expressed in any other system of coordinates and is not restricted to the polar coordinates used here.

Another type of spacial period spectrum of practical importance is $$R(d) = \int_0^{2\pi} P(d, \phi) d\phi \quad (2)$$

$R(d)$ has the following properties:

a. The negative of its derivative with respect to $d$ gives, approximately, the size distribution of projected area diameters of the components of the system.

b. Its moments are proportional to the moments of corresponding order of the size distribution.

c. Its second moment is equal to the zeroth moment of the previous spatial frequency spectrum.

The foregoing properties of the spatial period spectrum are of great practical importance as many geometrical characteristics of a system may be obtained from the far-field diffraction pattern processed to yield a parameter of the spatial period spectrum.

An object of the invention is to turn the new concept to practical account.

According to the invention a method of the kind set out above is characterized by the step of so filtering the far-field diffraction pattern (as obtained by known means) that a parameter of the spatial period spectrum is derived.

The parameter may be the spatial period spectrum itself or a moment of that spectrum.

The filtering may be effected by optical means. In this case a filter designed to yield the spatial period spectrum parameter in question is placed in front of the receiving screen or other receiver. Some filter designs are discussed below.

Alternatively the filtering may be effected electrically by suitably processing the signals derived by an electrical receiver from the far-field pattern. Conveniently this is done by controlling the gain of an output circuit at a suitable point.

The invention is further discussed with reference to the several embodiments illustrated in the accompanying drawings and described below with reference to those drawings, in which, FIG. 1 is a diagrammatic illustration of one embodiment of the invention, FIG. 2 illustrates one form of viewing screen, FIG. 3 is a view similar to FIG. 1 of a further embodiment, FIG. 4 is another view like FIG. 1 of another embodiment, FIG. 5 diagrammatically illustrates the receiver of another embodiment, FIG. 6 illustrates still a further type of receiver, and FIGS. 7 to 10 are representations of filters suitable for use with various embodiments of the invention for different purposes.

In FIG. 1 the chain line 11 is the optical axis. A source of coherent light such as a gas laser 12 or in incandescent lamp and spatial filter is focused by a converging lens 13 to a point 14 at the centre of a spatial sideband filter 15. After passing the sideband filter the beam diverges until it strikes a second converging lens 16. The object or group to be studied is represented in the drawing by 17 and is or are held in conventional holding frames. The drawing shows one undiffracted ray 19 and a diffracted ray 20 emerging from the object. The undiffracted rays, of which 19 is one example, are brought to a focus at the point 21 which is the conjugate point of the first focus 14.

The distance between the object 17 and the focus 21 is sufficient for the point 21 to be in the far-field of the components of the object 17. A viewing screen 25 is positioned at the point 21 and is used to observe the far-field diffraction pattern which is formed in this plane.

The apparatus thus far described is the same in principle as that used in the prior method described in the introduction to this specification.

The differences introduced by this invention are firstly the use of a filter 24 in contact with the screen 25. Secondly for viewing purposes the screen is patterned in the manner illustrated in FIG. 2. In this example graduations of the spatial period vary from 50 μm to 1 mm and the orientation from 0° to 360°. The spatial period scale is a reciprocal scale, the spatial period being related to the diffraction vector modulus by the equation $d = (2\pi/k)$.

Spatially periodic objects, that is objects whose shape can be represented by a function $f(r) = f(r+d)$ over a limited range of the spatial variable $r$, produce far-field patterns containing discrete bright spots at points on the viewing screen corresponding to spatial periods of $(d/n,)$ where $n = 0,1,2,3,...$.

Using a type of screen, of which FIG. 2 is an example, these values of the spatial period may be read off directly.

The position of the bright spots also gives the orientation of the periodic feature of the object and this may be read directly on the orientation scale.

The function of the filter 24 is to modify the illuminance at each point $(d, \phi)$ by the factor $d^{-2}$ so that the illuminance is proportional to $P(d, \phi)$ of equation (1). A suitable filter may be prepared photographically as a transparency with transmission coefficients at each point $(d)$, proportional to $d^{-2}$. The filter 24 is conveniently glued to the screen 25.

FIG. 3 illustrates an embodiment that uses a tungsten-halogen lamp 30 with a lens 31 forming an image of the filament on the opaque stop 32. A pin-hole 33 at the centre of the stop transmits light through the converging lens 16 to the specimen 34 supported by a transparent slide 35. A source of coherent light consisting of an incandescent lamp, a converging lens and a pin-hole spatial filter, as shown in FIG. 3, is appropriate when the components of the object 34 have linear dimensions of less than 10 μm and a diffraction pattern of very high resolution is not required.

Undiffracted rays, of which one, 36, is shown, are focused at the point 37 which is an image formed by the lens 16 of the pin-hole 33.

Diffracted rays, of which two (38 and 39) are shown, form a far-field diffraction pattern on a spatial filter 40, similar to the filter 24. The converging lens 46, shown here as two elements with the filter 40 between them, forms a reduced image of the object 34 on the small sensitive area 41 of a photo-cell 42. A narrow transmitting annulus 43 in an otherwise opaque stop 44 limits the rays falling on the sensitive region of the photocell to those passing through a narrow annular zone of the filter 40 corresponding to one value of the spatial period $d$. Provision is made for translating the stop 44 along the optical axis 11. The stop is shown in outline in another position 45 in which it transmits rays from another annular zone of the filter 40 corresponding to a smaller value of $d$, to the sensitive region 41.

Translation of the stop 44 may be effected in a variety of ways. A most convenient way is to move the stop by means of a worm gear with a quick-return mechanism.

The photocell current is amplified by an amplifier 47 and, as the stop 44 is translated along the axis, the spatial period spectrum $R(d)$ of equation (2) may be recorded as a continuous curve on the chart of a recording milliammeter 48.

Applications of the example of the invention represented by FIG. 3 include tissue matching by comparing the spatial period spectra of tissue sections; medical diagnosis by observing effects on the spatial spectrum due to changes in the geometrical characteristics of the cells, fibrous proteins, chromosomes and other components of tissues. It is also suitable for geometrical characterization of fine powders, features in photographs, insects wings and the like.

Another example is shown in FIG. 4, which represents an optical diffractometer similar to that of FIG. 1, in which the object 17 is now represented by a medium flowing through a flow cell 50.

As flowing media, gases or liquids may be used. This embodiment is particularly suitable for the geometrical analysis of suspensions of particles in a fluid.

The best flow cell consists of a short length of tubing 50 with transparent windows 51 and 52 let into opposite sides of the tubing. A cell of this type is convenient for coupling to flexible hoses used for transporting the suspension and interferes little with the flow. Having the axis of the tube vertical minimises the chances of particles settling on the windows, otherwise the direction of flow is immaterial.

Undiffracted rays, of which one, 53, is shown, are focused at the points 54 and 55 which are images of the first focus 14. A beam-splitter 56 divides the light equally between the two receivers 57 and 58. Disc-shaped silicon photo-voltaic cells make the most suitable receivers. Light diffracted by the suspension arrives on the receivers at points surrounding the foci 54 and 55. Only one diffracted ray 59 originating at the point 60 is shown. After division by the beam splitter 56 this ray arrives on the receiver 57 at the point 61 and on the receiver 56 at the point 62, the illuminance being modified at the points 63 and 64 by spatial filters 65 and 66, respectively.

The spatial filters 65 and 66 have transmission coefficients, or illuminance transfer functions, appropriate to the determination of two different moments of the spatial period spectrum. The current of the photocell 57 is amplified by an amplifier 67, rectified and integrated by the module 68 and the integral compared in the comparator 69 with a voltage reference 70. As soon as the integral registered on the integrator 68 equals the reference voltage, the digital printer 71 is given the command to print the integral registered by the integrator 73, and converted to digital form by the analogue-to-digital converter 72. The integrator 73 registers the integral of the current of the photocell 58 after amplification by the amplifier 74 and rectification.

In this way the reading printed out represents the ratio of the moments of the spatial period spectrum corresponding to the transfer functions of the spatial filters 65 and 66. Particularly useful results are area-to-volume ratio (specific surface if the mass density is known), which is proportional to the ratio of second moment to third moment, and the mean diameter which is proportional to the ratio of the first moment to the zeroth moment.

In FIG. 5 a number of circular photo-cells 81, 82, 83 of increasing diameter are stacked one behind the other in such a way that, except in the case of a first cell 81, an annular region of each cell is exposed to the diffracted light. One ray 24 is shown incident in the exposed annulus (shaded with diagonal lines) of the photo-cell 82.

Once more the system to be analysed is a suspension of particles in a fluid and flowing through a cell 50.

Each radiation detector cell is coupled to an amplifier 85, 86, 87 by means of a coupling 84 which transmits the fluctuating components only and removes the steady components. Couplings of this type are well known in electronics and include inductive couplings (transformers), inductance-capacitance couplings, and resistance-capacitance couplings.

The gain of each of the amplifiers 85, 86, 87 is adjusted to provide electronic filtering in terms of equation (1). In this case, therefore, optical filters are not used, but rather electronic filtering. The amplified signals are rectified by rectifiers 88 and integrated at 90. A scanner 91 scans the integrators 90 appropriate intervals and supplies the appropriate information to a printer 92.

This embodiment is based on the fact that the variance of a random variable is proportional to the expected mean value of the variable. A measure of the variance is therefore a measure of the expected mean value. It is assumed that in the case of a moving suspension the particles are randomly distributed in the suspending medium and enter the flow cell in a random sequence. The random variable is, in the problem under consideration, the diffracted power density.

The accuracy and precision of the method is therefore not limited by a background of diffracted light caused by dust particles depositing on, and by imperfections in the surfaces of, lenses and windows of the apparatus.

In the embodiment of FIG. 6, $P(d,\phi)$ may be recorded.

In this case there is a motor 100 that drives a shaft 103 through a reduction gearbox 101 and a solenoid operated clutch 102. At its end the shaft 103 carries a radial arm 104. The radial arm has a sleeve 105 arranged to slide along it in suitable keyways. The sleeve 105 is biassed to its radially outermost position by a tension spring 106. A string 107 connects the sleeve 105 to a drum 108 on the extremity of the shaft 103. Thus as the shaft 103 rotates the sleeve 105 moves radially inwardly. If the clutch 102 is declutched, the sleeve moves radially outwardly under the action of the spring 106.

The sleeve 105 carries a very small photocell 109 which is positioned to rotate in the plane of the far-field diffraction pattern. By means such as wires in the string 107 the output of the cell 109 is led to slip rings 110 on the shaft 103. This output is led to an amplifier 111 and through a gain control device 112 to a recording milliammeter 113.

Also on the shaft 103 is a gear 114 which drives a larger gear 115 fixed on a shaft 116. The gear 114 has a notch co-operating with a microswitch 117 that controls the clutch 102 and the motor 100. When the notch is in register with the microswitch 117, the clutch is declutched and the motor deenergised. The size of the gear 115 is so chosen and the phase of the gear is so arranged that the notch registers with the microswitch when the sleeve 105 is at its radially innermost position.

The shaft 116 also drives the gain control device 112.

The photocell 109 thus describes a spiral path from the periphery to the centre of the diffraction pattern in the far-field plane. The gain control device 112 is so chosen that the gain of the detector is proportional to $d^{-2}$. The output is recorded on the milliameter 113. The amplifier 111 may be either D.C. or A.C. coupled to the photocell 109. In the latter case the reading is proportional to $\sqrt{P}$.

Filters are constructed according to the purpose for which the device is intended. In theory the best filters are constructed on the half tone principle. Thus the filter area may be divided into a large number of small, substantially equal areas, say, on a equate grid. Around a centre point of the squares are then either blackened or left transparent in terms of the coefficient of transmission required for the area in which the square is situated. Subsequently the drawn pattern is reduced and the reduced picture used to prepare an intaglio type print.

In practical commercial instruments this high degree of accuracy has not yet become necessary. Depending on the ease with which the equation in question can be satisfied, one of three methods is used:

a. alternating dark and transparent rings about the centre, or b. dark and light areas alternating circumferentially and radiating outwardly, or c. a combination of (a) and (b).

A filter for determining the $n$'th moment has the illuminance transfer function $T(d,\phi) = 2d^{2-n}$ where $a$ is a constant. In practice it is sufficient that the average illuminance transfer function in predetermined zones meets the requirements of the equation. Practical filters therefore take the form shown in FIGS. 7 to 10. In practical instruments the size of the filter must be appropriate to the so-called "camera length" L of the diffractometer and the radius $r$ must be large enough to include the minimum value D of $d$ for which the illuminance has appreciable values. The radius is given by, $$r = (2\pi L/K D)$$

where $K$ is the wave number of the light.

FIG. 9 shows a filter which resembles a stemless four leaf clover, while

A wide variety of other filter configurations are possible, but the above four have been found adequate for most practical applications of the invention.

Figure 1:
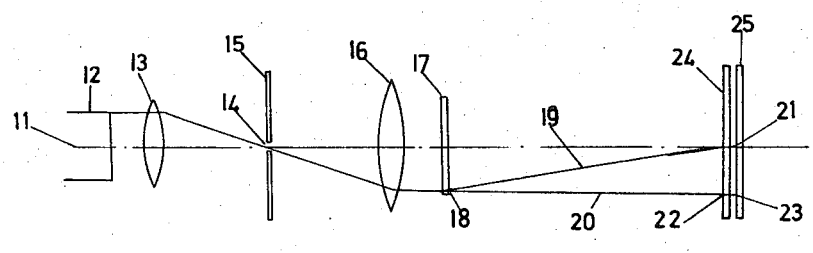
Figure 2:
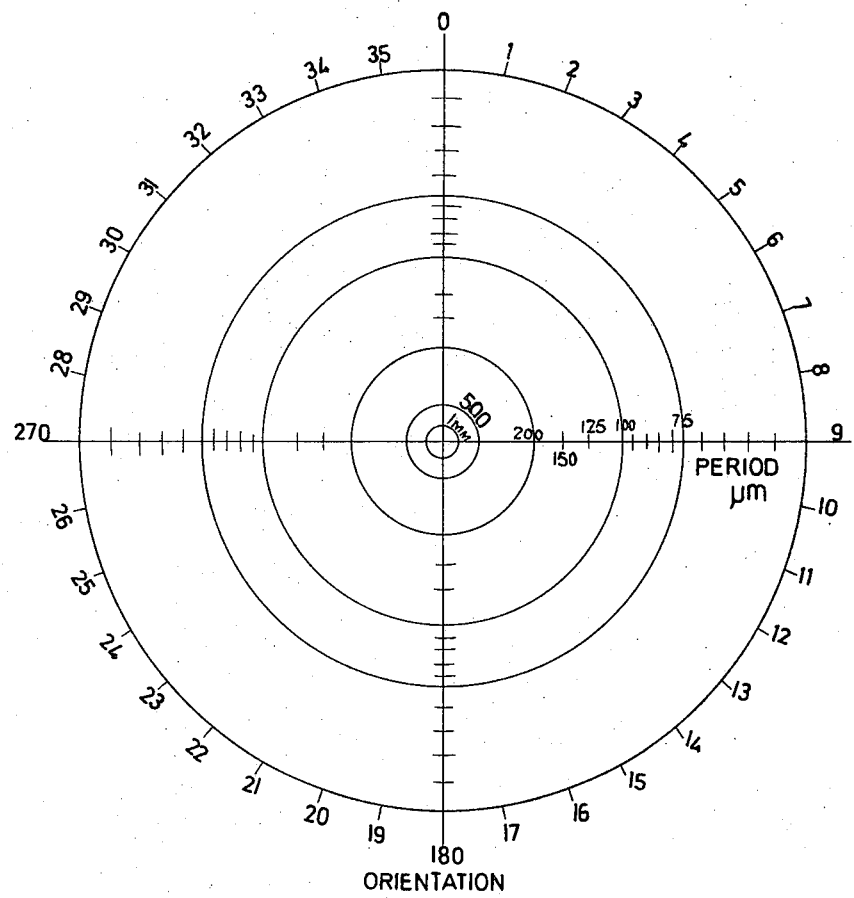
Figure 3:
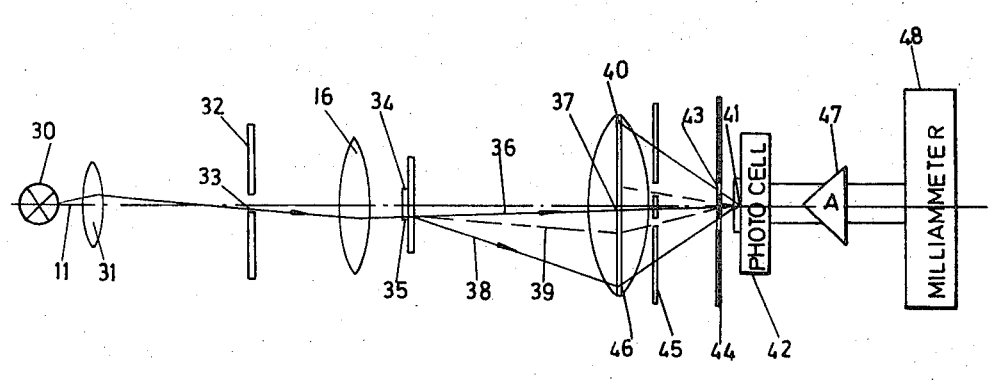
Figure 6:
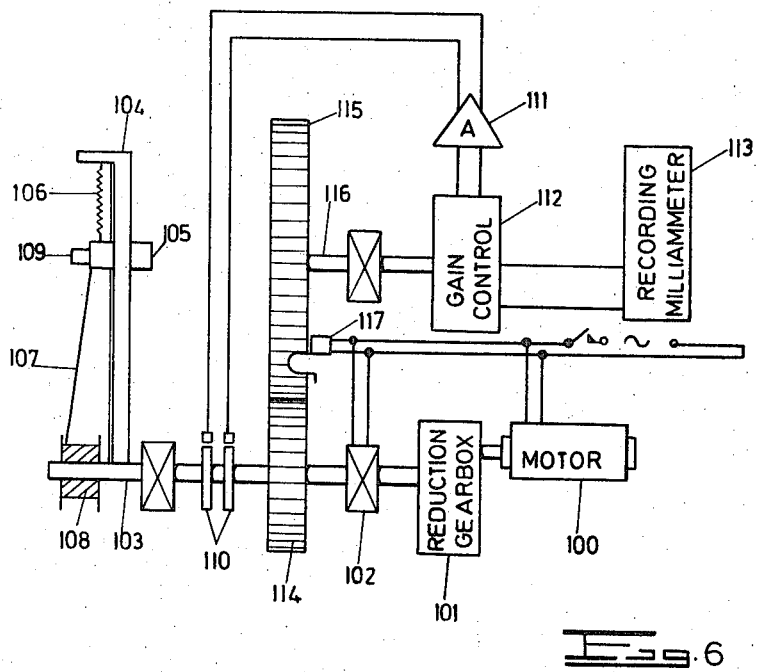

The invention is concerned with the spatial period spectrum and its moments. The spatial period spectrum can be obtained in several ways, but the following two are typical ways:

a. by using a filter as illustrated in FIG. 3. The angle subtended by the width of the annular opening in the stop 33 varies linearly with the distance from the photocell. Thus the combined action of the linear filter and the stop gives the same effect as a filter with a parabolic gradient.

b. by viewing it in the embodiment of FIG. 1 with a similar filter with a parabolic gradient.

c. by using a half tone filter with a parabolic transmission coefficient with the apparatus of FIG. 6.

Figure 9:
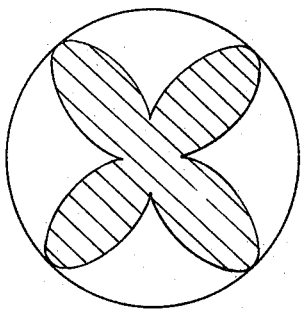
Figure 8:
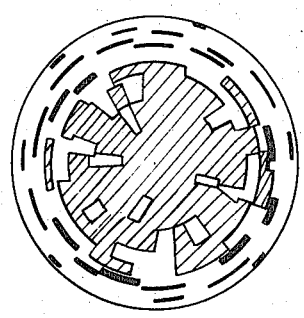
FIG. 8 shows a filter in which annular sectors have circumferentially distributed dark and transparent rows with a radial parabolic gradient.

The zeroth moment is obtained by using the filter of FIG. 8 or 9 in, say, the apparatus of FIG. 1, in which the viewing screen is replaced by a photocell. As will appear later or it can also be obtained in the FIG. 4 embodiment for further processing.

Figure 7:
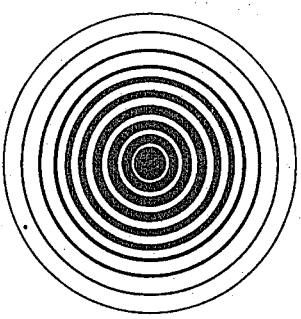
FIG. 7 shows a filter with alternating dark and transparent concentric rings about a centre. In some cases there is a linear gradient to the darkness and in others some other gradient such as a parabolic gradient.

The first moment is obtained with the filter of FIG. 7 having a linear gradient.

Figure 10:
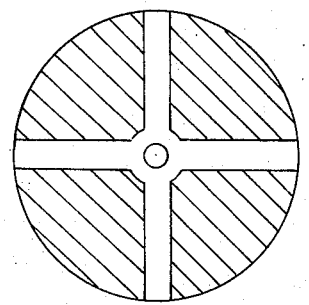
FIG. 10 shows a filter in which the transparent area is a straight cross.

The third moment is obtained with the filter of FIG. 10.

In terms of the terminology used in the present invention the second moment of the spatial spectrum is what appears on the screen in FIG. 1 without the filter 14 and hence is what appears on the screen of the prior art apparatus. The measurement of the second moment does not therefore form part of the present invention except in so far as it is obtained in combination with the other moments of the spatial period spectrum.

Other moments of the spatial period spectrum are obtainable in principle with suitable filters, but as far as the applicant is aware there is no practical need for these higher moments at this time.

Except for viewing photomicrographs and electron micrographs viewing of the spatial period spectrum or its moments is not of great practical value. However, the graphical or digital print-outs obtainable are of great value. If the graphs are suitably calibrated and the print-out mechanisms are suitably adjusted, the readouts obtained can represent quantitatively various geometrical characteristics of a system under investigation.

Figure 4:
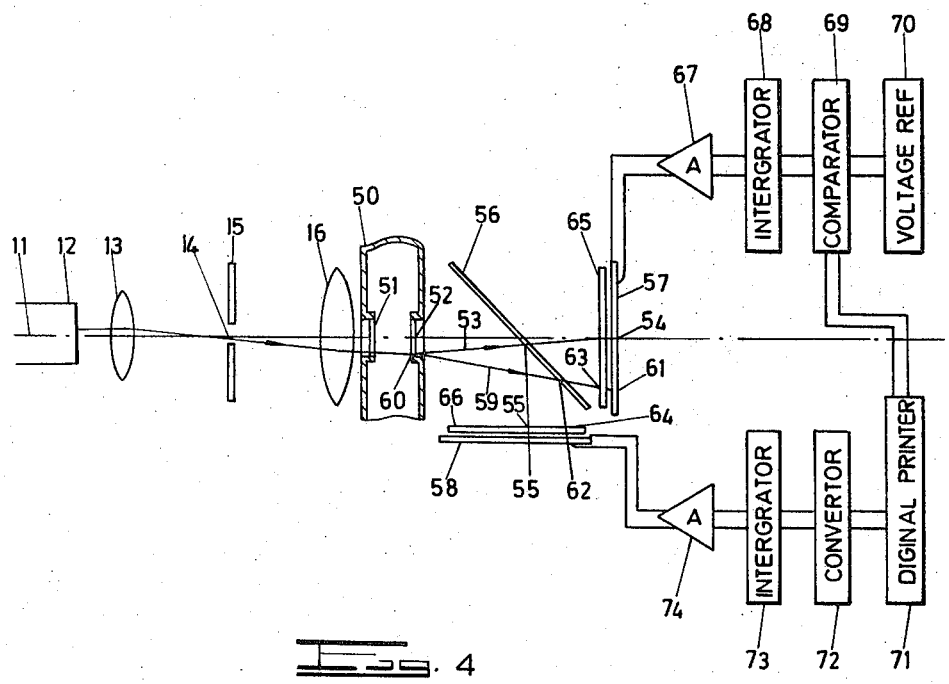
Figure 5:
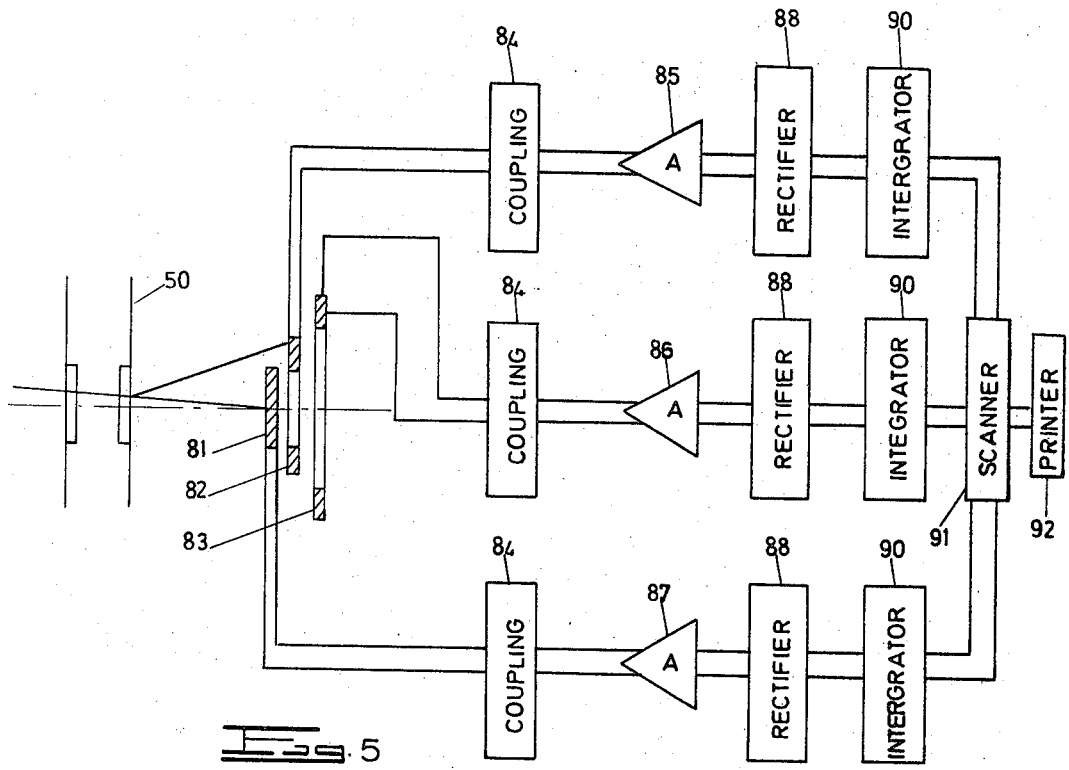

Some of the characteristics are:
a. size distribution of discrete elements in a system.

b. the number of components in a system - these being proportional to the zeroth moment of the spatial period spectrum;

c. the linear dimensions of the components of the system, which are proportional to the 1st moment of the spatial period spectrum;

d. the area of the components (second moment);

e. the volume of the components (third moment);

f. mean linear dimension (first moment divided by zeroth moment in FIG. 4);

g. specific surface area (second moment divided by third moment); and h. mean volume of the components (third moment divided by the zeroth moment).

Given equations (1) and (2) persons skilled in the art will have no difficulty in making the necessary calibrations and adjustments to obtain these quantitative measurements.

I claim:

1. A method of analyzing the geometrical characteristics of the components of a system, comprising the following steps:
   illuminating the system with coherent light;
   receiving the far field diffraction pattern of the system; variably attenuating the components of the far field diffraction pattern according to a rational power of the distance of a component from the center thereby to represent the spatial period spectrum on a parameter thereof, thereof,
   measuring the intensity of each attenuated component of the far field diffraction pattern; and displaying the result as a measure of the spatial period spectrum of the system or a parameter thereof.

2. The method claimed in claim 1 in which the far field diffraction pattern is obtained by detecting it electrically, an electrical output is obtained, and the gain of the output is varied according to a rational power of the distance of each component of the diffraction pattern to provide the necessary attenuation.

3. The method claimed in claim 2 in which any direct current component of the output is filtered out and the squares of the remaining components are integrated with respect to time to provide an estimate of the variance of the parameter of the spatial period spectrum.

4. The method claimed in claim 1 in which the light received by the receiver is optically filtered to provide the necessary attenuation.

5. The method claimed in claim 4 in which the light received is integrated over the area of the diffraction pattern by a photo-detection, the resulting integral being proportional to a moment of the spatial period spectrum.

6. The method claimed in claim 5 in which attenuation is according to the inverse square of the distance of a component from the centre, the representation being proportional to the zeroth moment of the spatial period spectrum and representing the number of components in the system.

7. The method in claim 5 in which attenuation is according to the reciprocal of the distance of a component from the centre, the representation being proportional to the first moment of the spatial period spectrum, representing the linear dimensions of the components of the system.

8. The method claimed in claim 5 in which attenuation is according to the first power of the distance of a component from the centre, the representation being proportional to the third moment of the spatial period spectrum, representing the volume of the components of the system.

9. The method claimed in claim 5 in which a first numerical representation is obtained by attenuation according to the inverse square of the distance of a component from the centre, a second numerical representation is obtained by attenuation according to the reciprocal of the distance of a component from the centre, and the second representation is divided by the first representation to give a measure of the mean linear dimension of the components of the system.

10. The method claimed in claim 5 in which a first numerical representation is obtained while not effecting attenuation, a second numerical representation is obtained by attenuation according to the first power of the distance of a component from the centre, and the first representation is divided by the second representation to give a measure of the specific surface area of the components of the system.

11. The method claimed in claim 5 in which a first numerical representation is obtained by attenuation according to the first power of the distance of a component from the centre, a second numerical representation is obtained by attenuation according to the reciprocal or the distance of a component from the centre, and the first representation is divided by the second representation to give a measure of the mean volume of the components.

12. The method claimed in claim 1 in which the attenuation is in proportion to the inverse square of the distance of a component from the center.

13. Apparatus for analyzing the geometrical characteristics of the components of a system, comprising a source of coherent light;
means for holding the system in the path of light coming from the source;
a receiver in a plane at such a distance from the holding means that a far field diffraction pattern of the illuminated system can impinge on the receiver;
means for variably attenuating the components of the far field diffraction pattern according to a rational power of the distance of a component from the center;
means for measuring the power of each attenuated component of the diffraction pattern;
and means for displaying the measurements as a measure of the spatial period spectrum of the system or a parameter thereof.

14. The apparatus claimed in claim 13 in which the receiver includes a photo-electric cell, a high pass electronic filter for removing any direct current components from the photo-cell output, and means for rectifying and integrating with respect to time over a predetermined time interval the remaining signals to provide an output of the receiver.

15. The apparatus claimed in claim 13 in which the attenuating means is an optical filter interposed between the receiver and the holding means.

16. The apparatus claimed in claim 15 in which the receiver is a viewing screen.

17. The apparatus claimed in claim 15 in which the receiver is a light detector.

18. The apparatus claimed in claim 17 including means for causing the light detector to describe a spiral path between the centre and the periphery of the diffraction pattern in the plane of the diffraction pattern.

19. The apparatus claimed in claim 17 in which the representation means is means to print out and display the light detector output.

20. The apparatus claimed in claim 13 in which the receiver comprises light detecting means and the attenuating means is means to adjust the gain of the output of the detecting means.

21. The apparatus claimed in claim 20 in which the light detecting means detects contiguous annular sections of the pattern separately and the gain of the output is varied for each section.

22. The apparatus claimed in claim 21 in which the representation means includes means to print out and display the separate outputs for each section.

23. The apparatus claimed in claim 13 including two receivers, a beam splitter between the receivers and the holding means and attenuating means for the pattern received by at least one receiver.

24. The apparatus claimed in claim 23 including a first integrator for integrating a first receiver output with respect to time, a second integrator for integrating a second receiver output with respect to time, a voltage reference, a voltage comparator connected to the first integrator and the voltage reference, means for recording the integral registered by the second integrator, means for giving a command to record the latter integral whenever the voltage of the first integrator equals the reference voltage and means for resetting the integrators.

* * * * *